June 12, 1956 H. KATZ 2,750,527

CATHODE FOR ELECTRICAL DISCHARGE DEVICE

Filed Nov. 19, 1952

Inventor:
Helmut Katz
By [signature] Atty.

United States Patent Office 2,750,527
Patented June 12, 1956

2,750,527
CATHODE FOR ELECTRICAL DISCHARGE DEVICE

Helmut Katz, Munich, Germany, assignor to Siemens & Halske Aktiengesellschaft, Munich, Germany, a corporation of Germany Application November 19, 1952, Serial No. 321,467

Claims priority, application Germany November 19, 1951

6 Claims. (Cl. 313—346)

This invention relates to cathodes for electric discharge devices, and is particularly concerned with a dispenser type cathode having a supply of an emissive material which migrates in operation through fine pores of a diffusion member. The particular object of the invention is to provide upon a porous diffusion member of a thickness which furnishes the required mechanical strength and which retains its porous structure substantially unchanged throughout the operation of the cathode, a metallic coating in the form of a thin film or layer to form the emissive surface thereon. This emissive film or layer is so thin as compared with the diffusion member that structural changes thereof that may occur incident to the provision of the layer or in operation do not affect the porosity of the diffusion member and the emissive surface thereon, i. e., the structure retains in operation the fine pores required for the migration of the emissive material.

If the diffusion member is in such a cathode made of sintered porous tungsten which also forms the emissive surface there is relative certainty that the corresponding body will retain its porous structure even at high temperatures; i. e., there will not occur a sintering-together, and fusing of the material of the body, and undesired closure of the fine pores and fissures will be avoided even at usually high operating temperatures.

It is desirable in many cases to provide an emissive surface formed by a metal which yields, together with the diffusing member, low emission characteristics. However, when a metal, e. g., such as molybdenum is used for this purpose, there is the danger that a sintering and fusing thereof will occur, thereby gradually closing the fine pores and fissures and consequently impeding or practically stopping emission.

The invention avoids this drawback by providing upon a porous diffusion member which in operation retains its fine pores, e. g., upon a body of porous tungsten a very thin film of a metal, e. g., molybdenum, which in and by itself would not retain a porous structure when subjected to high temperatures. However, when provided in the form of a very thin film or layer, e. g., by vaporizing the molybdenum on the sintered tungsten body, it will substantially remain porous or, rather to say, changes in the structure of such thin film will not substantially affect the porosity, and it is thus possible to provide an emissive surface of low emission characteristics.

Figure 1:
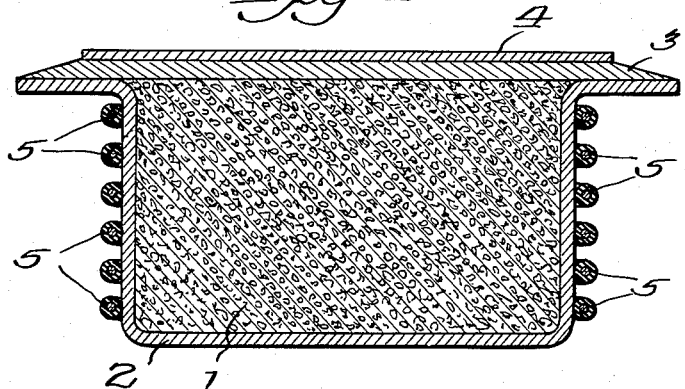
Figure 2:
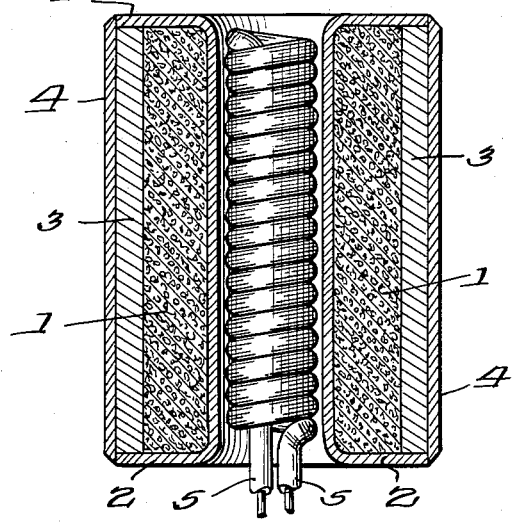

Examples of the invention will now be described with reference to the accompanying schematic drawings in which Fig. 1 shows in diagrammatic sectional view an example of a flat cathode;

Fig. 2 is a similar sectional view of a tubular cathode; and

Figure 3:
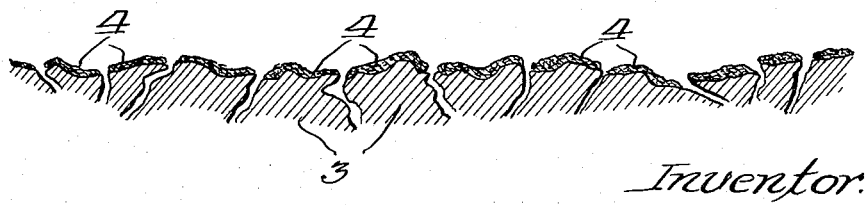

Fig. 3 indicates on an enlarged scale the thin film or layer of the metal forming the emissive surface on a porous diffusion member.

Referring now to Figs. 1 and 2, the supply of emissive material 1 is provided in a receptacle 2 which may be made of a dense metal such as molybdenum. The diffusion member or body 3 is made of a porous sintered material, e. g., of sintered tungsten. In Fig. 1, the member 3 is made in the form of a flat disk of relatively considerable thickness as required by the needed structural strength. In Fig. 2, the corresponding member is made in the form of a tubular body of similarly considerable thickness.

Upon the porous diffusion member 3 is in each embodiment provided a film or layer 4 of a metal such, e. g., as molybdenum, which is very thin as compared with the thickness of the diffusion member. This layer or film may be provided by vaporization and forms the emissive surface. Numeral 5 indicates the heater filament.

Fig. 3 shows, on a very much enlarged scale, a section through part of the porous sintered tungsten diffusion member 3 and the thin emissive surface film or layer 4 of molybdenum provided thereon. As shown, the member 3 has fine channels or pores which extend therethrough in irregular form. The fine channels terminate principally more or less at an angle to the plane of the surface of the sintered tungsten body, very rarely perpendicular thereto. The layer 4 is vaporized on the diffusion member perpendicular to the plane of the surface of the latter and is exceedingly thin. Accordingly, the vaporizing of the layer 4 on the member 3 may clog some of the pores but the majority of the pores will remain entirely unaffected. For all practical purposes, the porosity of the diffusion member 3 will remain substantially unaffected in the vaporizing process as well as during the operation of the cathode.

I claim:

1. A dispenser type cathode for use in an electric discharge tube comprising a receptacle member, a porous diffusion member made of material which substantially retains its porosity at relatively high temperature to which it is heated in the operation of the corresponding discharge tube, said diffusion member forming with said receptacle member a chamber containing emissive material, and a thin metallic emission layer disposed on said diffusion member, said emission layer consisting of a material that may fuse at the relatively high temperature to which it is heated in the operation of said discharge tube and being so thin that fusion thereof will not substantially impair the porosity of said diffusion member, whereby said emissive material is enabled to migrate through the pores of said diffusion member for emission from the surface of said emission layer.

2. The cathode defined in claim 1, wherein said receptacle member is made of molybdenum, said diffusion member being made of porous sintered tungsten, and said emission layer being made of molybdenum.

3. The cathode defined in claim 1, wherein said diffusion member is made of sintered tungsten and wherein said emission layer is made of molybdenum.

4. The cathode structure defined in claim 1, in which said diffusion member is formed by a sintered body made of high-melting metal.

5. The cathode defined in claim 1, in which said diffusion member is a porous sintered tungsten member.

6. The cathode structure defined in claim 1, in which said emission layer is a molybdenum layer.

References Cited in the file of this patent

UNITED STATES PATENTS

| Number | Name | Date |
|---|---|---|
| 2,128,861 | Tonks | Aug. 30, 1938 |
| 2,147,447 | Kolligs | Feb. 14, 1939 |
| 2,509,702 | Stanier | May 30, 1950 |
| 2,543,728 | Lemmens | Feb. 27, 1951 |
| 2,624,024 | Jansen | Dec. 30, 1952 |